(12) United States Patent
Kanade (10) Patent No.: US 11,175,006 B2
(45) Date of Patent: Nov. 16, 2021

(54) ADAPTIVE LIGHTING SYSTEM FOR EVEN ILLUMINATION

(71) Applicant: Udayan Kanade, Pune (IN)

(72) Inventor: Udayan Kanade, Pune (IN)

( * ) Notice: Subject to any disclaimer, the term of this patent is extended or adjusted under 35 U.S.C. 154(b) by 0 days.

(21) Appl. No.: 17/273,085

(22) PCT Filed: Sep. 4, 2019

(86) PCT No.: PCT/IB2019/057453
§ 371 (c)(1),
(2) Date: Mar. 3, 2021

(87) PCT Pub. No.: WO2020/049483
PCT Pub. Date: Mar. 12, 2020

(65) Prior Publication Data
US 2021/0270436 A1 Sep. 2, 2021

(30) Foreign Application Priority Data
Sep. 4, 2018 (IN) .............................. 201821033146

(51) Int. Cl.
*F21S 10/06* (2006.01)
*A42B 3/04* (2006.01)
*F21V 23/04* (2006.01)
*B60Q 1/14* (2006.01)

(52) U.S. Cl.
CPC .............. *F21S 10/06* (2013.01); *A42B 3/044* (2013.01); *F21V 23/0442* (2013.01); *B60Q 1/143* (2013.01)

(58) Field of Classification Search
CPC ............. F21S 10/06; A42B 3/04; F21V 23/04
See application file for complete search history.

(56) References Cited

U.S. PATENT DOCUMENTS

| | | | |
|---|---|---|---|
| 7,952,292 | B2 | 5/2011 | Vegter et al. |
| 8,619,241 | B2 | 12/2013 | Mimeault |
| 8,848,029 | B2 | 9/2014 | Moletti et al. |
| RE46,930 | E | 7/2018 | Mimeault |
| 10,228,654 | B2 | 3/2019 | Christmas et al. |
| 10,264,657 | B2 | 4/2019 | Liszt et al. |
| 10,356,857 | B2 | 7/2019 | Melanson |
| 2015/0035440 | A1 | 2/2015 | Spero |
| 2018/0020145 | A1 | 1/2018 | Kotfis et al. |
| 2018/0276985 | A1 | 9/2018 | Kim et al. |

*Primary Examiner* — Thomas M Sember (57) ABSTRACT

An adaptive lighting system for even illumination is provided. In an embodiment, multiple lamps illuminate light in different areas or zones of the surroundings. These lamps modulate their light output in a known (but imperceptible) pattern. One or more light detectors detects light from the surroundings. Light sourced from each lamp is disambiguated and one or more light time-of-flight delays are calculated for each lamp-light detector pair. Based on these calculated delays, illumination levels of the lights are adjusted so as to produce even illumination.

7 Claims, 8 Drawing Sheets

ADAPTIVE LIGHTING SYSTEM FOR EVEN ILLUMINATION

This patent claims priority from provisional patent application 201821033146 titled "ADAPTIVE LIGHTING SYSTEM FOR EVEN ILLUMINATION" filed in Mumbai, India on 4 Sep. 2018.

TECHNICAL FIELD

This patent relates to illumination. More specifically, the patent relates to an adaptive lighting system for even illumination.

BACKGROUND ART

Miners, rescue workers, security personnel, certain construction workers, astronauts, divers wear helmets or suits that have inbuilt lamps to illuminate their surroundings. The lamps have to be powerful enough to illuminate dark surroundings, but as a result, as these personnel walk close to certain objects, walls, obstructions etc., the light falling on these objects is so bright as to cause visual discomfort to the personnel. Visual discomfort aside, there is more light falling on nearby objects and less light falling on distant objects thus giving uneven illumination and hampering visibility.

The present invention is a wearable/portable system for even illumination; which can be used by such personnel to achieve even illumination in dark surroundings.

SUMMARY OF INVENTION

An adaptive lighting system for even illumination is provided. In an embodiment, multiple lamps illuminate light in different areas or zones of the surroundings. These lamps modulate their light output in a known (but imperceptible) pattern. One or more light detectors detects light from the surroundings. Light sourced from each lamp is disambiguated and one or more light time-of-flight delays are calculated for each lamp-light detector pair. Based on these calculated delays, illumination levels of the lights are adjusted so as to produce even illumination.

The above and other preferred features, including various details of implementation and combination of elements are more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF DRAWINGS

The accompanying drawings, which are included as part of the present specification, illustrate the presently preferred embodiment and together with the general description given above and the detailed description of the preferred embodiment given below serve to explain and teach the principles of the present invention.

DESCRIPTION OF EMBODIMENTS

An adaptive lighting system for even illumination is provided. In an embodiment, multiple lamps illuminate light in different areas or zones of the surroundings. These lamps modulate their light output in a known (but imperceptible) pattern. One or more light detectors detects light from the surroundings. Light sourced from each lamp is disambiguated and one or more light time-of-flight delays are calculated for each lamp-light detector pair. Based on these calculated delays, illumination levels of the lights are adjusted so as to produce even illumination.

Figure 1:
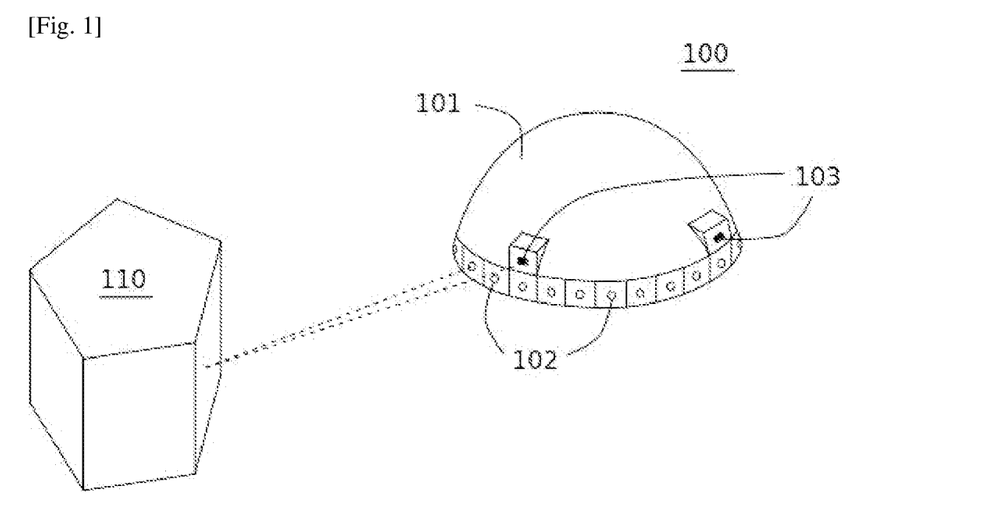
FIG. 1 depicts a system of producing even illumination provided on a helmet.

FIG. 1 depicts a system 100 of producing even illumination provided on a helmet 101.

One or multiple lamps 102 are provided on a helmet 101. Alternatively, the multiple lamps 102 may be mounted on any single body such as a hand-held rod, on a vehicle, on a rig, etc. Each lamp 102 illuminates an area or zone of the surroundings. Each lamp 102 produces flashes of light at a very high speed. The speed of flashing is chosen to be much faster than the human eye can detect, so that the human eye sees constant illumination. The speed of flashing may also be chosen to be multiple times the speed of movie or video camera shutters or frame rates, so that video/movie cameras do not capture any flashing either. The flashing may not be of an on-off type but some other kind of modulation, with some modulation depth. For example sinusoidal or square wave modulation of a depth equal to or less than 100% may be used.

One or more light detectors 103 are placed on the same body 101 as the lamps. The body 101 on which the lamps 102 and detectors 103 are placed may be a rigid body in parts where the lamps 102 and detectors 103 are mounted, such that the geometric relations of the lamps 102 and detectors 103 with respect to each other remain fixed. Light from the lamps 102 travels to various surrounding objects 110, reflects back from them and enters the one or more light detectors 103. This light gets delayed by an amount equivalent to the sum of the two travel times. This delay is detected, and from this detection, the distance to the object 110 illuminated by each lamp 102 is detected. The total illumination output of each lamp 102 is then adjusted in such a way that uniform illumination on all illuminated objects is achieved. In general, lamps illuminating closer objects will produce less illumination output than lamps illuminating farther objects. For example, illumination may be increased directly proportional to the square of the detected distance. Beyond a certain large distance, a different law may be used, and for distances smaller than a certain small distance, a different law may be used as well. The total illumination may not be adjusted immediately when a change in light delays is observed, but at a slightly slower (smoothened) pace so that jarring flashes of light are not observed by the user. In the case an accelerometer is also provided as part of the apparatus, changes in orientation can be detected quickly and lighting changes to compensate for changes in orientation can be done very fast, but lighting changes due to other detected changes can still be slowed down or their transitions can be smoothened.

The system 100 is especially helpful in situations where the system 100 is illuminating surroundings which will otherwise be completely or mostly dark. Such a situation may occur in mining, forest operations, maintenance situations, emergency rescue operations, security operations, submarine or space operations, etc. By ensuring even illumination on all illuminated objects, the visibility of the surroundings is enhanced, comfort is increased, and power is spent optimally.

Figure 2:
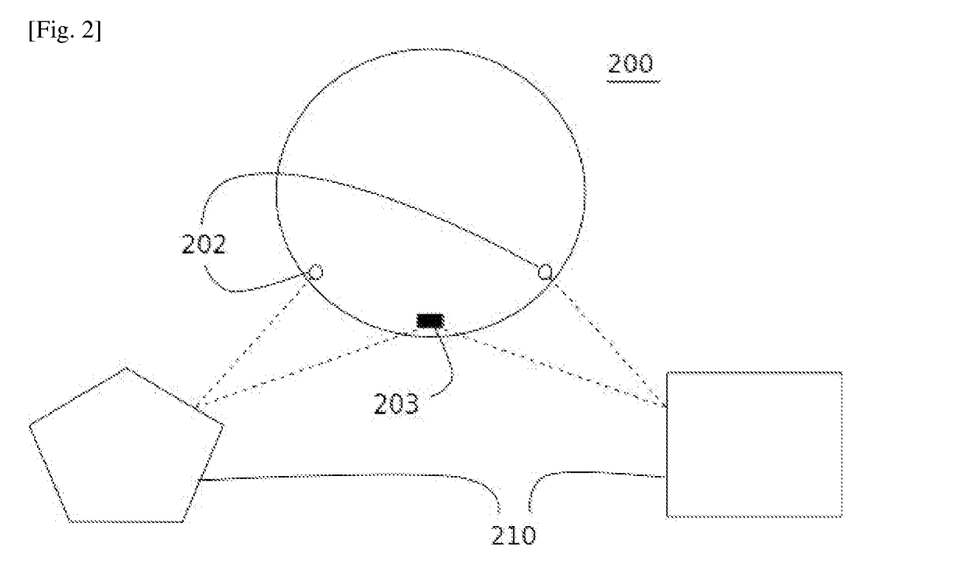
FIG. 2 depicts a system in which a single detector receives reflected light that started at more than one lamps.

FIG. 2 depicts a system 200 in which a single detector 203 receives reflected light that started at more than one lamps 202. The lamps 202 are illuminating various objects 210 and the distance to these various objects 210 from the system 200 may not be the same. Light reflected by the various objects 210 is detected by the detector 203. In this case, an algorithm is used to disambiguate the reflections from each of the lamps using the flashing sequence.

Figure 3:
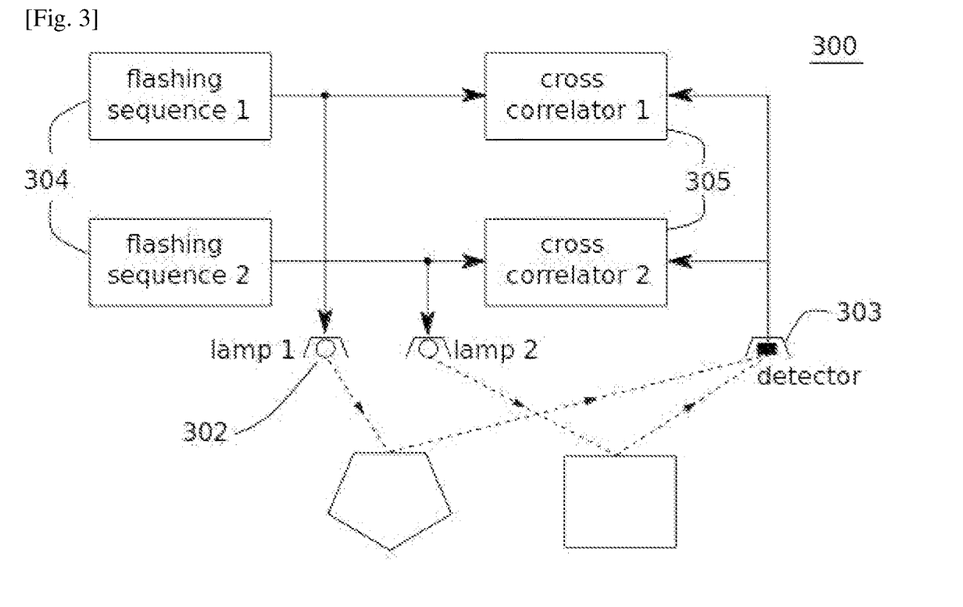
FIG. 3 depicts a system to disambiguate reflections from one or more than one lamps.

FIG. 3 depicts a system 300 to disambiguate reflections from one or more than one lamps 302.

Each lamp 302 has a separate flashing sequence 304, and the flashing sequences 304 are chosen such that various flashing sequences 304 are uncorrelated with each other, even after various shifts. For example such flashing sequences may be periodic waveforms (sinusoidal, square wave or other waveforms) of different frequencies, or random or pseudo-random sequences of bits or numbers.

The signal detected at the detector 303 is a mix of the one or more than one flashing sequences 304 with various delays. Using one or more cross correlators 305 the contribution of individual flashing sequences 304 is disambiguated in the signal detected at the detector 303, and delays are detected as well. The cross correlators 305 may be embedded in the detector 303 itself, or they may be analog electronic circuits, or digital electronic circuits, or software.

In case there are more than one light detectors, similar disambiguation structure may be repeated for every detector.

Figure 4:
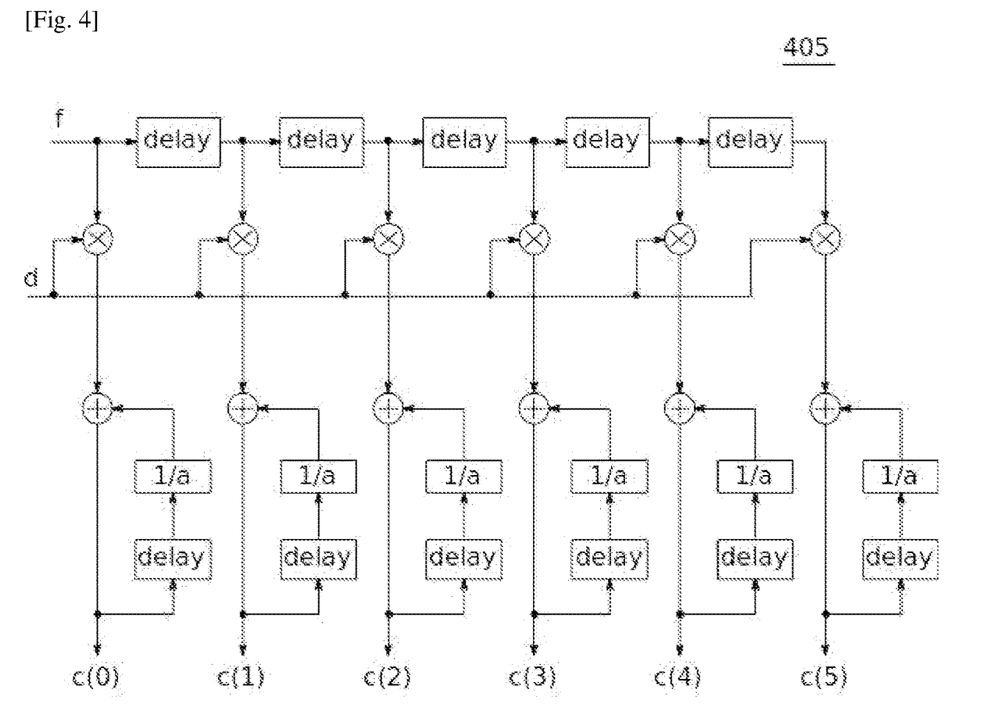
FIG. 4 depicts a cross correlator as a schematic circuit.

FIG. 4 depicts a cross correlator 405 as a schematic circuit.

In an embodiment, the cross correlator 405, corresponding to a particular lamp and detector pair, and produces a cross correlation sequence at each time step. The cross correlation at a time step j for a signal delay of k may be calculated as $$c_j(k)=(1/a)c_{j-1}(k)+d(j)f(j-k)$$

where c is the cross correlation calculated at the $j^{th}$ time step, $c_{j-1}$ is the cross correlation calculated at the $j-1^{th}$ time step, d is the detected signal at the light detector and f is the flashing sequence used by the lamp.

Figure 5:
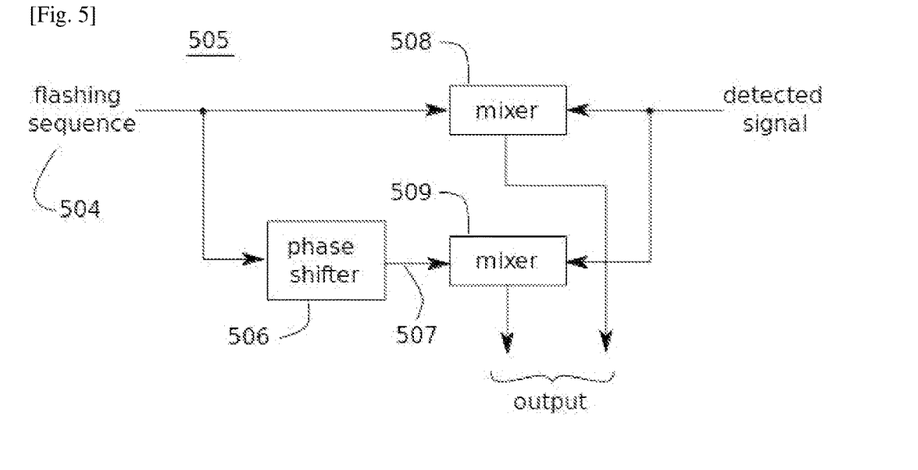
FIG. 5 depicts another cross correlator as a schematic circuit.

FIG. 5 depicts another cross correlator 505 as a schematic circuit. A flashing sequence 504 is a periodic sequence, such as a square wave or sinusoidal sequence. This sequence is phase shifted by 90 degrees by phase shifter 506. (Alternatively, both the flashing sequence 504 and its phase shifted version 507 are created together by an oscillator, circuit or computation.) Both the original sequence 504 and its phase shifted version sequence 507 are mixed in mixers 508 and 509 with the detected signal. The mixing is a nonlinear combination of the two signals such as a multiplication of the two signals, or adding the two signals and then passing them through a non-linear amplifier (such as a non-linear function or a crystal (diode/transistor) based amplifier, etc.). The mixer also has a means for filtering out of higher frequency components and keeping low frequency components. The nonlinear combination and filtering may be done using an analog electronic circuit or other analog component (such as a SAW filter), or a digital circuit or a computation. The nonlinear combination may also be done directly at the optical detector by modifying the sensitivity of the optical detector using the flashing sequence (original or phase shifted). This may be done for example by applying and removing the electronic shutter potential of a CCD or CMOS sensor, changing the amplification factor of a light signal detection circuit (or amplifier), by changing the opacity of an LCD or other optical shutter, or changing the aperture of a mechanical shutter.

The two values detected by the two signals can be converted into a phase angle (taking the arc tangent of the ratio of the two values, or the atan 2 of the two values), and this phase angle can be used detect the time delay taken by the light in traveling from the lamp to the detector. In an embodiment, various light components of a lamp (for example red/green/blue light components or yellow/blue light components) are flashing at different flashing frequencies. The light detector comprises filters that separate the light components and each light component is separately detected by a light detector. In this way, phase angles at multiple flashing frequencies may be detected, and the total delay between the lamp and the detector can be calculated better this way. In particular, the total delay d (to be detected) follows the following equations (one for each light component)

$$d=k_1t_1+p_1$$

$$d=k_2t_2+p_2$$

. . .

where $k_i$ are unknown integers, $t_i$ are the flashing time periods and $p_i$ are the detected phase angles. Since d and $k_i$ are unknown, a single equation cannot be solved, but multiple such equations can be solved if the range of d is known to be a finite range. If two three or more such phase angles $p_i$ are available at different flashing frequencies (and thus different $t_i$) d is chosen such that there exist integers $k_i$ such that the sum of errors in the above equations is a minimum.

The more than one lamps of the system of the present invention will be flashing at different frequencies; thus the effect of the light of one lamp on the correlator output correlating with the signal of another lamp will be minimal.

Figure 6:
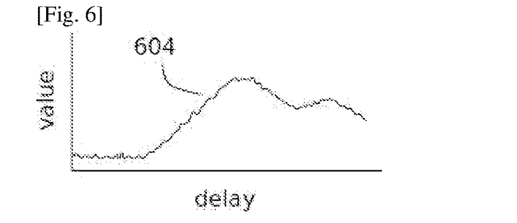
FIG. 6 depicts a typical cross correlation sequence from a cross correlator.

FIG. 6 depicts a typical cross correlation sequence 604 from a cross correlator.

This cross correlation sequence is a sequence of numbers labeled by delays; a number in the sequence is labeled by a particular delay value that corresponds to a specific time delay of light traveling from the particular lamp to the particular detector.

Figure 7:
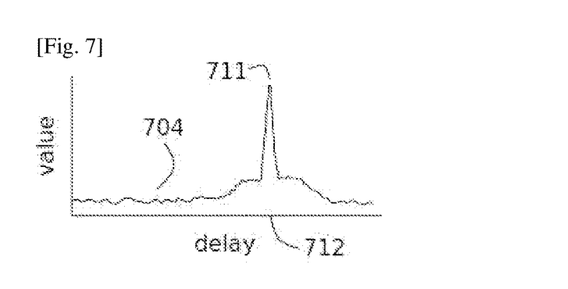
FIG. 7 depicts another typical cross correlation sequence from a cross correlator.

FIG. 7 depicts another typical cross correlation sequence 704 from a cross correlator.

A peak 711 at a particular delay value 712 indicates that the indicated delay has been observed in the cross correlation. The peak is detected by a peak detection algorithm. The delay value corresponding to the detected peak is converted to a distance by multiplying by the speed of light, and optionally dividing by two to convert from roundtrip distance to single distance. The distance is then converted to a lamp illumination parameter. Instead of converting the delay to a distance, the delay may be converted directly to the lamp illumination parameter. The lamp illumination parameter may be in terms of optical lamp output or lamp power output, or it may be in terms of a circuit setting such as a lamp current setting.

Figure 8:
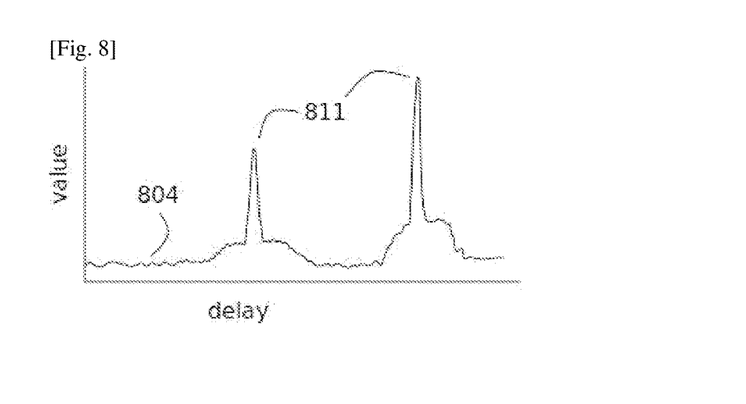
FIG. 8 depicts yet another typical cross correlation sequence from a cross correlator.

FIG. 8 depicts yet another typical cross correlation sequence 804 from a cross correlator.

In certain cases, more than one distances may be detected in the form of the correlation sequence producing more than one spikes 811. This may be taken to mean that a single lamp illuminates more than one objects. In this case, an algorithm chooses the illumination to be effected. If the signal from the peak with lesser delay is larger than a certain threshold value (indicating the nearer of the bodies is larger than a certain size or optical presence (visual area times albedo)), it will be chosen as the primary illumination target. If the nearer body is small, the far body will be chosen as the primary illumination target.

In another embodiment, a weighted average of the delay of the peaks is taken to be an indicative delay and the illumination parameter is chosen based on this indicative delay. The weights for the weighted average may be heights of the corresponding peaks or a function of the heights of the corresponding peaks; the weight corresponding to a peak may be the height of the peak divided by a number that is a fixed pre-determined function of the delay of the particular peak.

In an embodiment, the above weighted average is taken without peak detection, i.e. each delay value of the correlation sequence is used to calculate the indicative delay. The delay values are weighted based on the correlation sequence heights (amounts detected) in a manner similar to that of the preceding paragraph.

Figure 9:
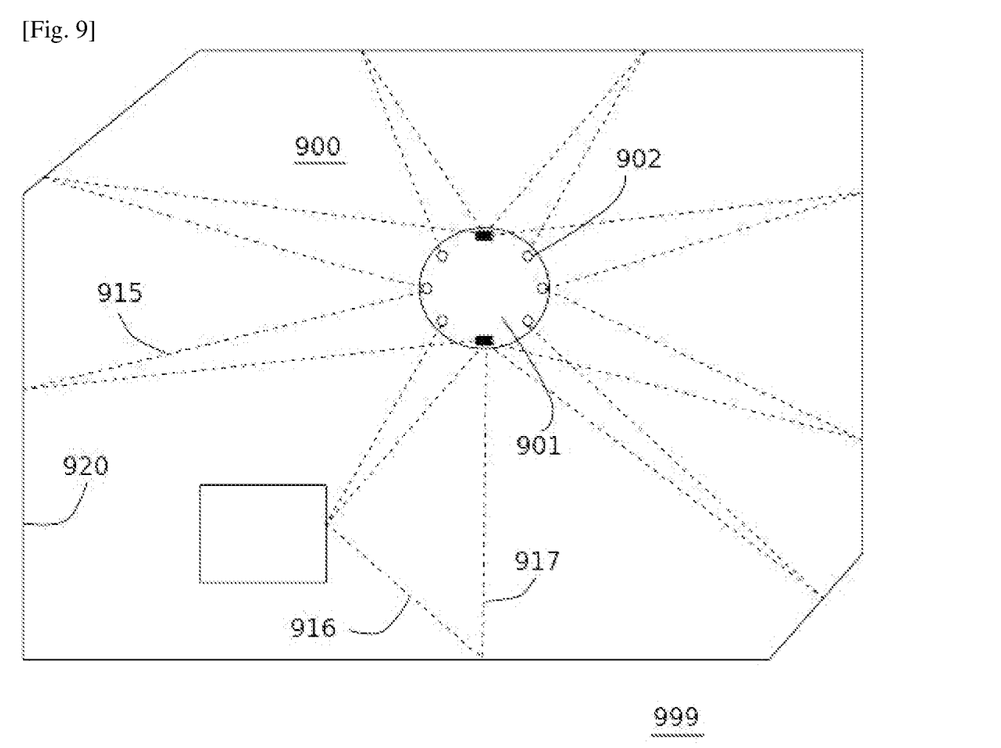
FIG. 9 depicts a situation wherein a system of producing even illumination provided on a helmet is illuminating a room.

FIG. 9 depicts a situation 999 wherein a system 900 of producing even illumination provided on a helmet 901 is illuminating a room 920.

Various lamps 902 illuminate all points in the room 920 directly (as illustrated by light path 915) as well as indirectly (as illustrated by light path 916). By calculating the correlation sequences for each lamp-detector pair and knowing the cones of illumination and location of each lamp and the one or more detectors, an approximate reconstruction of surrounding shapes is created. Reflections that are secondary (as illustrated by light path 917), tertiary and so forth help to further refine this reconstruction.

In such a reconstruction, still objects may be detected separately from moving objects. An accelerometer may be mounted on the helmet 901 or the illumination platform to help separate still and moving objects. Moving objects may be flagged for many purposes. For rescue workers, etc., a moving object may mean an individual to be rescued or a coworker. In security situations, moving objects may present a threat. An audible alarm may be used to alert the user. Alternately, if the presence of humans is detected, the light in that direction may be dimmed so as to not hurt the eyes of that human. For this purpose, humans may be detected directly as well, e.g. through one or more video cameras.

The surrounding geometry may be detected by means other than (or in addition to) flashing lamps as well, such as by multiple video cameras, depth sensing techniques, structured light projection, LIDAR, RADAR, SONAR, etc. This geometry may then be used to dim or brighten each lamp so that an even illumination is achieved.

The one or more light detectors may have multiple pixels, and may have a lens. Each pixel has a correlation being calculated for each lamp. Alternatively, there are multiple detectors with each detector having a narrow field of view. This creates a more detailed understanding of the surrounding geometry, improving the accuracy of illumination and other goals such as not blinding other humans and co-workers.

For each light detector, it is possible to detect the relative fraction of illumination received by that light detector that comes from each particular lamp. If multiple objects are being tracked, then objects detected at the same delay (or very close delays) bouncing light created by lamps having overlapping regions of illumination may be detected as one object (especially if they are tracked to be moving in tandem), and furthermore the relative fraction of illumination received by that object from each of its illuminating lamps is detected. Detection of relative fractions is done by comparing the heights of the peaks of the correlation sequences. The best illumination is achieved by setting the individual lamp illumination levels such that various objects detected will have a level of illumination dependent on the detected distance of the objects, the illumination on the object being calculated based on the illumination levels of the lamps illuminating it and the detected relative fractions.

Figure 10:
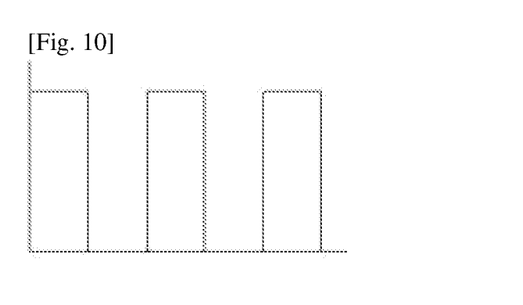
FIG. 10 depicts an on-off flashing sequence.

FIG. 10 depicts an on-off flashing sequence.

The on-off flashing sequence drives a lamp to turn alternately on and off. The on-off flashing sequence may have a different frequency for different lamps. The on-off flashing sequence may have a duty cycle of 50% or a variable duty cycle. The illumination output of the lamp may be changed by changing the duty cycle. The illumination output of the lamp may be changed by changing the current passing through the lamp in the 'on' phase.

In figures depicting flashing sequences, the x-axis represents time, and the y-axis represents the flashing sequence value. According to various embodiments of the present equation, the flashing sequence value may be interpreted as the current through the lamp, some parameter affecting the current through the lamp, the power output of the lamp, or the optical output of the lamp. In the specific case of FIG. 10, the flashing sequence values may be thought of as a binary scheme where '0' implies the lamp is turned off and '1' implies the lamp is turned on.

Figure 11:
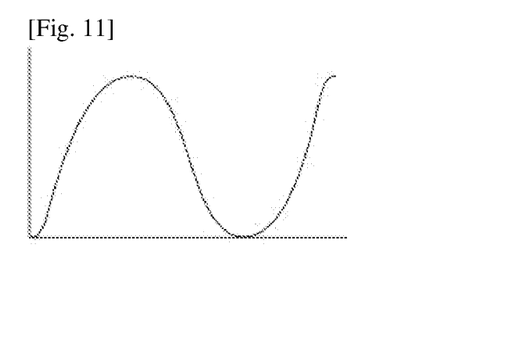
FIG. 11 depicts a sinusoidal flashing sequence.

FIG. 11 depicts a sinusoidal flashing sequence.

The sinusoidal flashing sequence may have a different frequency for different lamps. The illumination output of the lamp may be changed by changing the peak current passing through the lamp.

In an embodiment, the sequence passed to the cross correlator is a square of the sequence passed to the lamp. This is useful because the sequence passed to the lamp will create a particular lamp current and the light power produced by the lamp will be approximately proportional to the square of the current, and the light power detected at the detector will be proportional to the light power produced by the lamp. For example, the sequence passed to the lamp may have positive and negative peaks, whereas that passed to the correlator may be the one shown in FIG. 11.

Figure 12:
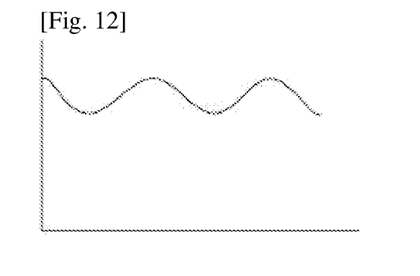
FIG. 12 depicts a sinusoidal flashing sequence with modulation depth less than 100%.

FIG. 12 depicts a sinusoidal flashing sequence with modulation depth less than 100%.

Modulation depth less than 100% implies the lamp does not turn completely off while flashing. In this way, the perception of flashing (for human eyes or for video cameras) may be further reduced. Furthermore, more average illumination can be produced by a modulation depth of less than 100% than that which can be produced by a modulation depth of 100%. The illumination output of the lamp can be changed by changing the modulation depth or changing the quiescent level of current through the lamp.

Figure 13:
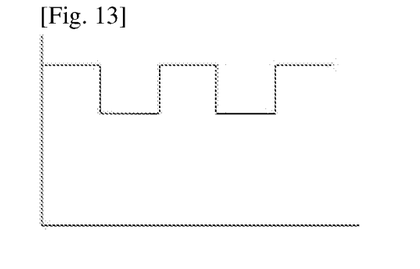
FIG. 13 depicts a square wave flashing sequence with modulation depth less than 100%.

FIG. 13 depicts a square wave flashing sequence with modulation depth less than 100%. The illumination output of the lamp can be changed by changing the duty cycle, the modulation depth or the quiescent level of current through the lamp.

Figure 14:
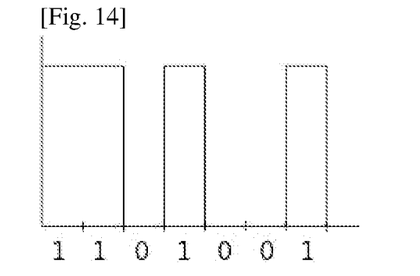
FIG. 14 depicts a random on-off flashing sequence.

FIG. 14 depicts a random on-off flashing sequence.

The random sequence may be generated by a source of random bits, or a pseudo-random calculation. A '1' bit drives the corresponding lamp to be on and a 'O' bit drives it to be off. The random sequence may be chosen such that on an average, a particular fraction of the randomly generated bits are '0's and the others are '1's. In this way, the illumination output of the corresponding lamp may be set.

Figure 15:
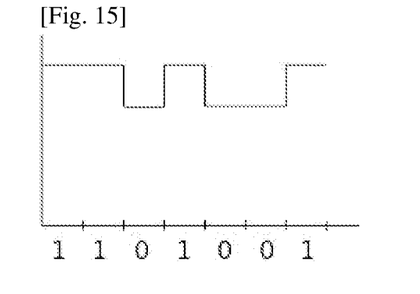
FIG. 15 depicts a random square wave flashing sequence with modulation depth less than 100%.

FIG. 15 depicts a random square wave flashing sequence with modulation depth less than 100%. The illumination output of the lamp may be changed by changing the quiescent current level, the modulation depth or the fraction of bits that are '0's.

Figure 16:
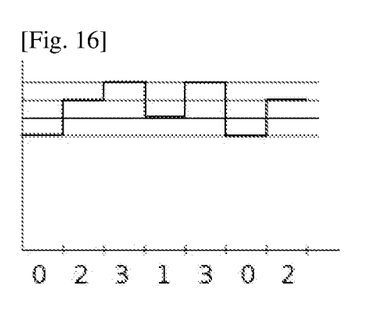
FIG. 16 depicts a flashing sequence with more than two levels and modulation depth less than 100%.

FIG. 16 depicts a flashing sequence with more than two levels and modulation depth less than 100%. A repeating or random sequence having more than two numerical levels may be used.

Figure 17:
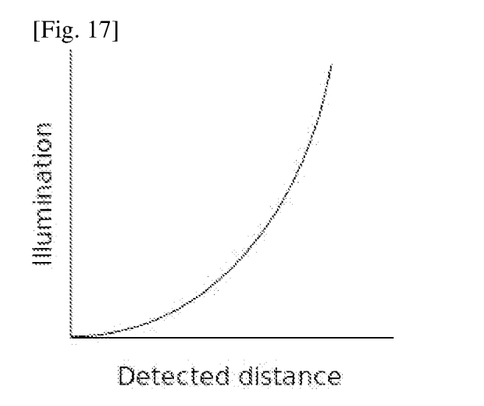
FIG. 17 depicts a law of calculating the illumination of a lamp based on the detected distance.

FIG. 17 depicts a law of calculating the illumination of a lamp based on the detected distance. The illumination of the lamp is calculated to be proportional to the square of the detected distance. The calculated illumination of the lamp will be used to set the actual illumination output of the lamp using any of the techniques described in this patent, or standard techniques known in the art.

Figure 18:
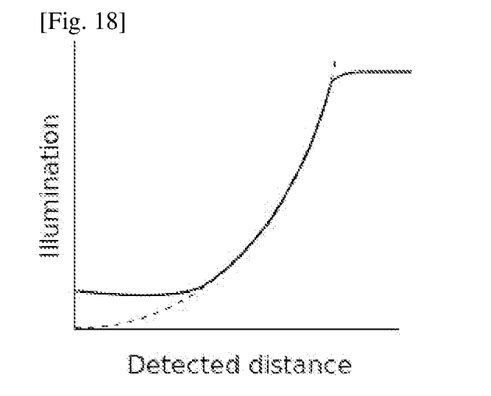
FIG. 18 depicts another law of calculating the illumination of a lamp based on the detected distance.

FIG. 18 depicts another law of calculating the illumination of a lamp based on the detected distance. At an intermediate range of detected distances, the illumination is calculated to be proportional to the square of the detected distance. In an embodiment, at a distance smaller than the intermediate range of distances, the illumination is of a higher value than that calculated by the square law, in this way, extremely dark zones in illumination will not be created. In an embodiment, at a distance larger than the intermediate range of distances, illumination falls off from the square law to a constant—in this way large distances can be accommodated without exceeding lighting circuit specifications.

Figure 19:
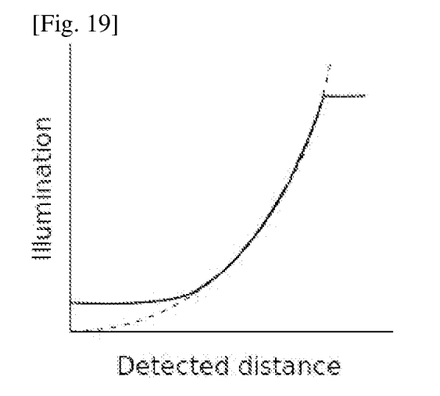
FIG. 19 depicts yet another law of calculating the illumination of a lamp based on the detected distance.

FIG. 19 depicts yet another law of calculating the illumination of a lamp based on the detected distance. The illumination of the lamp is calculated proportional to the square of the detected distance plus a constant: this constant reduces the sensitivity of the system to detected changes in the environment. In an embodiment, at a level beyond which the lighting circuit can manage, the illumination of the lamp is calculated to be a fixed constant equal to the maximum permissible illumination value for the lighting circuit.

Figure 20:
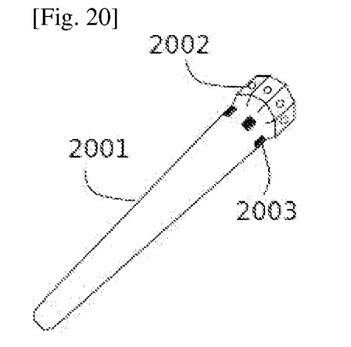
FIG. 20 depicts a system of producing even illumination provided on a hand-held rod.

FIG. 20 depicts a system of producing even illumination provided on a hand-held rod 2001. A hand held rod 2001 has lamps 2002 and light detectors 2003. The lamps 2002 and detector 2003 are absent from a grip portion of the rod 2001. This rod may be used to illuminate surroundings in the dark, and creates even illumination on the surroundings using the features of the present invention.

Figure 21:
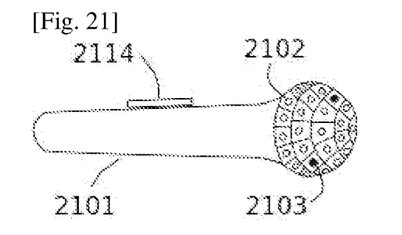
FIG. 21 depicts a system of producing even illumination provided on a hand-held illuminator.

FIG. 21 depicts a system of producing even illumination provided on a hand-held illuminator 2101. A hand held illuminator 2101 has lamps 2102, light detectors 2103 and an on-off switch 2114. It may be held by a person like a flashlight (battery torch), and creates even illumination on the surroundings using the features of the present invention. The lamps 2102 are provided towards one end of the illuminator 2101.

Figure 22:
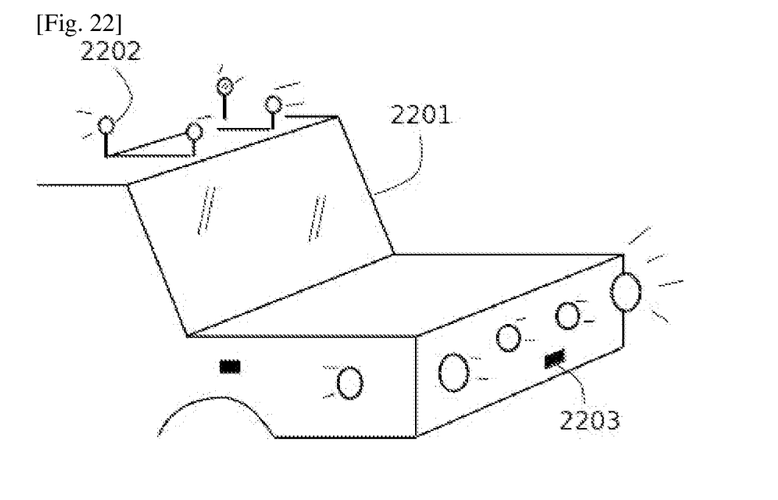
FIG. 22 depicts a system of producing even illumination provided on a vehicle.

FIG. 22 depicts a system of producing even illumination provided on a vehicle 2201. The vehicle 2201 has many lamps 2202 and some light detectors 2203. It will create even illumination on the surroundings using the features of the present invention.

Figure 23:
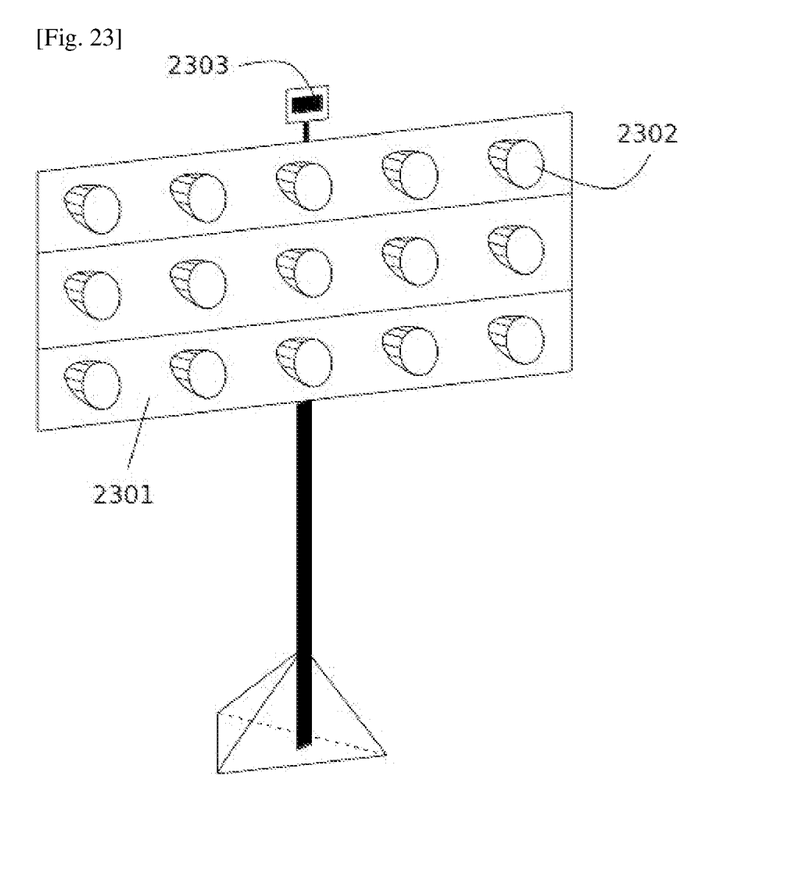
FIG. 23 depicts a system of producing even illumination provided on a rig.

FIG. 23 depicts a system of producing even illumination provided on a rig 2301. A rig 2301 has lamps 2302 and light detectors 2303. It will create even illumination on the surroundings using the features of the present invention. Many more ways of assembling the system of the present invention may be imagined by a person having ordinary skill in the art, and are within the scope of the present invention. The system of the present invention may have a single lamp, and may change its illumination level based on a detected distance.

An adaptive lighting system for even illumination is disclosed. It is understood that the embodiments described herein are for the purpose of elucidation and should not be considered limiting the subject matter of the present patent. Various modifications, uses, substitutions, recombinations, improvements, methods of productions without departing from the scope or spirit of the present invention would be evident to a person skilled in the art.

The invention claimed is:

1. A system comprising:
   a first rigid body
   a plurality of lamps attached to the first rigid body, and
   one or more light detectors attached to the first rigid body,
      wherein each lamp illuminates a zone of the surroundings,
   each lamp modulates a light output in accordance with a flashing sequence,
   the one or more light detectors detect light reflected from the surroundings, and the system is configured to change illumination levels of the lamps in such a way that lamps illuminating closer objects produce less illumination output than lamps illuminating farther objects.

2. The system of claim 1, further comprising one or more correlators, wherein each correlator combines the flashing sequence of a lamp with an output of a light detector of the one or more light detectors to produce a delay measurement.

3. The system of claim 2, wherein at least one correlator comprises a first mixer, a second mixer and a second sequence, wherein the second sequence is the flashing sequence shifted by a certain phase angle, the first mixer mixes the flashing sequence with the output of the light detector and the second mixer mixes the second sequence with the output of the light detector.

4. The system of claim 2, wherein a correlator produces a correlation sequence.

5. The system of claim 1, wherein the rigid body is a helmet.

6. The system of claim 1, further comprising an accelerometer.

7. A method comprising:
providing a first rigid body,
providing a plurality of lamps attached to the first rigid body,
providing one or more light detectors attached to the first body,
modulating a light output of each lamp in accordance with a flashing sequence,
detecting light reflected from the surroundings using the one or more light detectors,
correlating an output of a light detector with a flashing sequence to generate at least one delay estimate,
setting an illumination output of a lamp based on the delay estimate.

\* \* \* \* \*